J. HEIM.
HOG HANGER AND SPREADER.
APPLICATION FILED MAY 23, 1908.
902,655.
Patented Nov. 3, 1908.
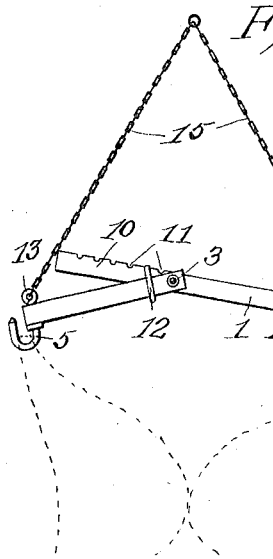
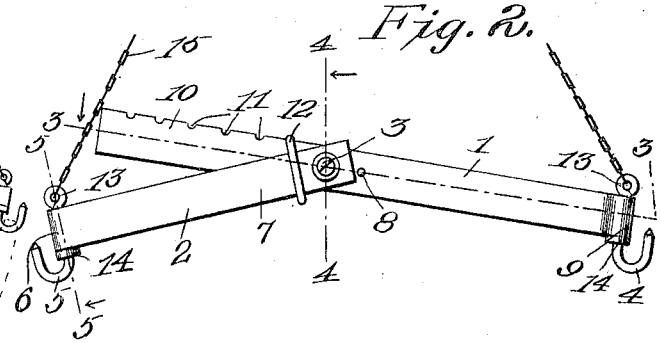
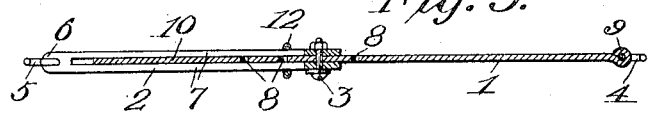
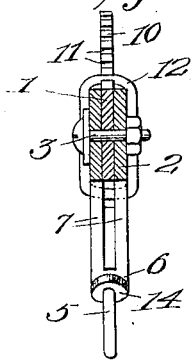
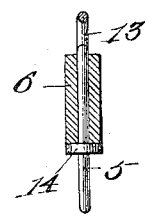
Witnesses
James F. Crown
M. L. Skinner
Inventor
Jared Heim
By Watson E. Coleman
Attorney

UNITED STATES PATENT OFFICE.

JARED HEIM, OF RUTLAND, IOWA.

HOG HANGER AND SPREADER.

No. 902,655.  Specification of Letters Patent.  Patented Nov. 3, 1908.

Application filed May 23, 1908. Serial No. 434,533.

*To all whom it may concern:*

Be it known that I, JARED HEIM, a citizen of the United States, residing at Rutland, in the county of Humboldt and State of Iowa, have invented certain new and useful Improvements in Hog Hangers and Spreaders, of which the following is a specification, reference being had to the accompanying drawings.

My invention is an improved hog hanger and spreader, and consists of the novel features of construction and the combination and arrangement of parts hereinafter fully described and claimed.

The object of the invention is to provide a device of this character which will be simple and inexpensive in construction, capable of being easily adjusted for hogs or other animals of different sizes and one which will effectively accomplish the intended purpose.

The above and other objects of the invention are attained in its preferred embodiment illustrated in the accompanying drawings, in which Figure 1 is a side elevation of the invention showing it in use, the animal being indicated in dotted lines; Fig. 2 is an enlarged side elevation; Fig. 3 is a longitudinal section on the plane 3—3 in Fig. 2; and Figs. 4 and 5 are detail transverse sections taken, respectively, on the planes indicated by the lines 4—4, and 5—5 in Fig. 2.

My improved hog hanger and spreader comprises two members or bars 1, 2 which are pivotally connected at 3 and which carry at their outer ends supporting hooks 4, 5. The ends of each of the members which do not carry the hooks are hereinafter termed the inner ends. The members 1, 2 are preferably made of flat metal strips or plates and the member 2 is here shown as in the form of two of such plates united at their outer ends by a solid part 6 to serve as a bearing for the hook 5 and having its ends spaced apart to provide parallel portions or arms 7, the extremities of which are apertured to receive the pivot 3, the latter being here shown in the form of a removable bolt. Said spaced arms or portions 7 of the member 2 are adapted to receive the member 1 between them and the two members are preferably adjustably united by forming in the member 1 a longitudinal series of holes or openings 8 through any one of which the pivot 3 may be passed. The member 1 has its outer end bent upon itself to provide a pivot eye or bearing 9 for the hook 4 and its opposite end or the portion 10 which extends beyond the pivot 3 and swings between the spaced portions or arms 7 of the member 2, is adapted to be adjustably connected to said portions or arms 7 to hold the hooks 4, 5 at any desired distance apart. This adjustable connection is preferably effected by forming in the upper edge of the portion or end 10 of the member 1 a series of notches 11 which provide a rack, and by slidably arranging on the parts 7, 10 a loop or link 12 adapted to be engaged with any one of the notches 11, thereby limiting the swinging movement of the two members with respect to each other. The hooks 4, 5 have their shanks rotatably mounted in the bearings 9, 6 and their upper ends are preferably bent to form eyes 13 while their lower ends are shaped to provide upturned hooks. Stop collars 14 are arranged on the shanks of the hooks beneath the bearings 6, 9, as shown. To permit the device to be suspended from a suitable support, I preferably connect the eyes 13 by a chain or the like 15.

In using the device the keeper loop or ring 12 is moved close to the pivot 3 so that the members may be swung at an angle to each other to bring the hooks 4, 5 together and enable them to be readily engaged with the animal. The members 1, 2 are then swung with respect to each other so as to force the hooks apart and they may be quickly and easily retained in such position by sliding the loop or ring 12 outwardly until it drops into the proper notch 11 of the rack.

From the foregoing it will be seen that my device is exceedingly simple in construction so that it may be produced at a small cost and will be strong and durable and it will be further noted that owing to its simplicity of adjustment it may be quickly and easily applied to and removed from animals of different sizes.

Having thus described my invention what I claim is:

1. A device of the character described comprising pivotally connected members, one member having the pivot arranged intermediate its ends, and also having a rack formed upon its inner end, a keeper loop slidable upon the other member and adapted to engage said rack, and supporting means carried by the outer ends of said members.

2. A device of the character described comprising two members, one being adjustably pivoted at its end to the other at a point intermediate the ends of the latter, supporting means upon the outer ends of said members, and a slidable keeper upon the member having the pivot at its end and adapted to engage the inner end of the other member to maintain said members in adjusted angular relation.

3. A device of the character described comprising two members, one being formed intermediate its ends with a longitudinal series of openings, a pivot passing through the inner end of the other member and through one of said series of openings, suspending means carried by the outer ends of said members, the inner end of the member having said series of openings being provided upon its inner edge with a series of notches, and a keeper loop or ring slidable upon the other member and adapted to engage said notches.

4. A device of the character described comprising a member having spaced portions, a second member arranged between said spaced portions of the member and pivoted between said portions at a point intermediate its ends, suspending means at the outer ends of said members and a slidable keeper upon the member having the spaced portions and adapted to engage the inner end of the other member to hold the two members in adjusted angular relation.

In testimony whereof I hereunto affix my signature in the presence of two witnesses.

JARED HEIM.

Witnesses:
  A. HERNERSEN,
  S. O. ROSSING.